United States Patent
Bilancia

(10) Patent No.: US 9,567,892 B2
(45) Date of Patent: Feb. 14, 2017

(54) COOLING SYSTEM FOR AN INTERNAL COMBUSTION ENGINE

(71) Applicant: GM GLOBAL TECHNOLOGY OPERATIONS LLC, Detroit, MI (US)

(72) Inventor: Michele Bilancia, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 134 days.

(21) Appl. No.: 14/514,149

(22) Filed: Oct. 14, 2014

(65) Prior Publication Data
US 2015/0101549 A1    Apr. 16, 2015

(30) Foreign Application Priority Data
Oct. 14, 2013  (GB) .................. 1318141.7

(51) Int. Cl.
| | |
|---|---|
| F01P 1/06 | (2006.01) |
| F01N 3/04 | (2006.01) |
| F01P 3/02 | (2006.01) |
| F02F 1/24 | (2006.01) |
| F02F 1/36 | (2006.01) |

(52) U.S. Cl.
CPC .............. *F01P 1/06* (2013.01); *F01N 3/046* (2013.01); *F01P 3/02* (2013.01); *F02F 1/243* (2013.01); *F02F 1/36* (2013.01); *F01P 2003/027* (2013.01); *F01P 2060/02* (2013.01); *F01P 2060/04* (2013.01); *Y02T 10/20* (2013.01)

(58) Field of Classification Search
CPC ..... F01P 3/02; F01P 2060/16; F01P 2007/146; F01P 2037/02; F01P 7/14; F01P 2060/00; F01P 5/10; F01P 1/02; F01P 3/00; F01P 3/18

USPC ........... 123/41.01, 41.31, 41.02, 41.3, 41.57, 123/41.71

See application file for complete search history.

(56) References Cited

U.S. PATENT DOCUMENTS

| 3,851,629 A * | 12/1974 | Mayr ........................ F01P 7/16 123/41.02 |
| 6,325,026 B1 * | 12/2001 | Suzuki .................... F01P 7/165 123/142.5 R |
| 7,255,130 B2 * | 8/2007 | Martins .............. B60H 1/00485 123/41.08 |
| 7,721,683 B2 * | 5/2010 | Lutz ......................... F01P 3/02 123/41.1 |

(Continued)

FOREIGN PATENT DOCUMENTS

| DE | 102013208857 A1 | 11/2013 |
| GB | 2506467 A | 4/2014 |

*Primary Examiner* — Long T Tran
(74) *Attorney, Agent, or Firm* — Lorenz & Kopf LLP

(57) ABSTRACT

A cooling system for an internal combustion engine is disclosed. The cooling system includes a radiator for exchanging heat between a coolant and ambient air, and a coolant pump for circulating the coolant. The coolant system further includes a first set of fluid connection branches between the coolant pump and the engine block, the cylinder head and the exhaust manifold and a second set of fluid connection branches between the engine block, cylinder head and exhaust manifold and the radiator and/or the coolant pump. A first controlled valve intercepts the coolant towards the radiator so that the coolant is recirculated towards the coolant pump. A second controlled valve intercepts the coolant from the cylinder block. A third controlled valve intercepts the coolant from the integrated exhaust manifold.

13 Claims, 3 Drawing Sheets

(56) References Cited

U.S. PATENT DOCUMENTS

| | | | |
|---|---|---|---|
| 2004/0050544 A1* | 3/2004 | Hohl | F01P 7/165 165/202 |
| 2012/0067545 A1* | 3/2012 | Yamazaki | F01M 5/00 165/52 |
| 2012/0111003 A1* | 5/2012 | Kasuya | F01K 13/02 60/618 |
| 2012/0216761 A1* | 8/2012 | Takahashi | F01P 7/16 123/41.02 |
| 2012/0312257 A1 | 12/2012 | Beyer et al. | |
| 2013/0213322 A1* | 8/2013 | Takeuchi | F01P 3/02 123/41.1 |
| 2013/0305708 A1 | 11/2013 | Zahdeh et al. | |

* cited by examiner

COOLING SYSTEM FOR AN INTERNAL COMBUSTION ENGINE

CROSS REFERENCE TO RELATED APPLICATION

This application claims priority to British Patent Application No. 1318141.7 filed Oct. 14, 2013, which is incorporated herein by reference in its entirety.

TECHNICAL FIELD

The technical field relates to a cooling system for an internal combustion engine. In particular, the cooling system is an advanced "split" cooling system and the internal combustion engine is provided with an exhaust manifold, which is integrated in the cylinder head.

BACKGROUND

As known, internal combustion engines generate mechanical power by extracting energy from heat flows. Engines are inefficient, so more heat energy enters the engine than comes out as mechanical power. The difference is waste heat, which must be removed. Internal combustion engines remove waste heat through cool intake air, hot exhaust gases, and explicit engine cooling. Cooling is also needed because high temperatures damage engine materials and lubricants. Internal-combustion engines burn fuel hotter than the melting temperature of engine materials, and hot enough to set fire to lubricants.

Engine cooling removes energy fast enough to keep temperatures low so the engine can survive. Most internal combustion engines are fluid cooled using a liquid coolant run through a heat exchanger (radiator) cooled by air. Liquid-cooled engines usually have a circulation pump.

Modern internal combustion engines use a split cooling system, which features separate circuits for the head and cylinder block, enabling faster warm-up. In particular, during warm up the split cooling layout can allow to cool at first the cylinder head alone and only after a given time interval the cylinder block too. The reason is that the cylinder head has a lower mass than the engine block and is exposed at very high temperature. Therefore, the cylinder head becomes warmer than the cylinder block and needs to be cooled earlier. Some advantages are reached, by means of such split cooling system: oil optimum temperature, better combustion conditions, faster warm up, reduced specific consumption and emissions.

Moreover, recent studies and product developments have shown that there is a significant potential to be tapped by using a cylinder head integrated exhaust manifold with turbo charged engines. It offers a win-win employment of technology providing improvements in the relevant attributes as well as a cost reduction, in particular, achieving better fuel economy while reducing emissions. With the catalytic converter closer to the engine exhaust point, the emissions reduction process begins sooner, resulting in lower emissions. Due to less surface area, such solution also contributes to a reduction in engine noise at idle.

On the other hand, split cooling system for internal combustion engines having an integrated exhaust manifold are not suitable for such engines that needs fast temperature warm-up for the exhaust line, as Diesel engines. For such engines is very important to reach as fast as possible the so called light-off temperature, i.e. the temperature at which catalytic reactions are initiated within a catalytic converter.

Therefore a need exists for a new split cooling system which is suitable for engine architectures foreseeing an integrated exhaust manifold.

SUMMARY

The present disclosure provides a split cooling system for internal combustion engines having an exhaust manifold integrated in the cylinder head. An embodiment of the disclosure provides a cooling system for an internal combustion engine. The engine includes an engine block, a cylinder head and an exhaust manifold, integrated in the cylinder head. The cooling system includes a radiator for exchanging heat between a coolant and ambient air, a coolant pump for circulating the coolant, a first set of fluid connection branches between the coolant pump and the engine block, the cylinder head and the exhaust manifold, a second set of fluid connection branches between the engine block, cylinder head and exhaust manifold and the radiator and/or the coolant pump, a first controlled valve for intercepting the coolant towards the radiator so that the coolant is recirculated towards the coolant pump, a second controlled valve for intercepting the coolant from the cylinder block and a third controlled valve for intercepting the coolant from the integrated exhaust manifold.

An advantage of this embodiment is that this cooling system leads to recover exhaust heat also for engines that are very sensitive to exhaust temperatures, by adding in its layout a controlled valve by means of which the cooling of the exhaust manifold could occur or be avoided.

According to another embodiment, the first controlled valve is a 3-way valve, having an inlet, for collecting all coolant coming from the internal combustion engine, a first outlet in a fluid connection with the coolant pump and a second outlet in a fluid connection with the radiator. An advantage of this embodiment is that the cooling system is able to manage the engine warm up phase, avoiding that the coolant is cooled by the radiator.

According to a further embodiment, the second controlled valve is located downstream the engine block and in a fluid connection with the first controlled valve. An advantage of this embodiment is that the engine block becomes warm later than the cylinder head and therefore it does not need to be cooled during early warm up phase.

According to still another embodiment, the third controlled valve is located downstream the exhaust manifold and in a fluid connection with the first controlled valve. An advantage of this embodiment is that, this third valve gives the opportunity to recover heat from the exhaust line also for engines (like diesels) very sensitive to the exhaust line warm-up time.

According to a still further embodiment, the cooling system also includes an oil heat exchanger. An advantage of this embodiment is that the cooling system also recovers heat from the engine oil.

According to still another embodiment, the cooling system also includes an electric heater. An advantage of this embodiment is that the cooling system also recovers heat from the electric heater.

According to an aspect of the present disclosure, the system is configured to switch on the coolant pump, to close the second and the third controlled valves and to open the first outlet of the first controlled valve, so that the coolant flows from the coolant pump to the cylinder head and back to the coolant pump, by-passing the radiator. An advantage of this configuration, which occurs in the very beginning of the warm up phase, is that only the cylinder head will be cooled, and this is beneficial since the cylinder head gets immediately very high temperature, while the engine block and the exhaust manifold will not be cooled. This allows the exhaust gas to immediately reach the light-off temperature.

According to another aspect, the system is configured to keep the coolant pump switched on, to close the second controlled valve and to open the first outlet of the first controlled valve and the third controlled valve, so that a first given amount of the coolant flows from the coolant pump to the cylinder head, a second given amount of the coolant flows from the coolant pump to the exhaust manifold, both first and second given amount of coolant flowing back to the coolant pump, by-passing the radiator. An advantage of this aspect is that after the light-off temperature is reached, the third controlled valve is open, giving the opportunity to recover heat from the exhaust line, also for that engines very sensitive to the exhaust line warm-up time.

According to a further aspect, the system is configured to keep the coolant pump switched on, to open the first outlet of the first controlled valve, the second controlled valve and the third controlled valve, so that a first given amount of the coolant flows from the coolant pump to the cylinder head, a second given amount of the coolant flows from the coolant pump to the exhaust manifold, a third given amount of the coolant flows from the coolant pump to the engine block, both first, second and third given amount of coolant flowing back to the coolant pump, by-passing the radiator. An advantage of this aspect is to allow, during later warm up time, that also the engine block starts to be cooled, together with the other engine components.

According to still another aspect, the system is configured to keep the coolant pump switched on, to open the second outlet of the first controlled valve, the second controlled valve and the third controlled valve, so that a first given amount of the coolant flows from the coolant pump to the cylinder head, a second given amount of the coolant flows from the coolant pump to the exhaust manifold, a third given amount of the coolant flows from the coolant pump to the engine block, both first, second and third given amount of coolant flowing back to the radiator and then to the coolant pump. An advantage of this aspect is that the coolant will also flow through the radiator, no more by-passing it, when it needs to be cooled.

According to a still further aspect the system is configured to open the third controlled valve if an exhaust gas temperature is higher than an exhaust gas temperature threshold. An advantage of this aspect is that the exhaust manifold will be cooled as soon as the exhaust gases have reached a temperature threshold which corresponds to the light-off temperature of the catalysts.

According to another embodiment the exhaust gas temperature threshold is equal to 200° C. This is a temperature value very close to an average light-off temperature of the catalysts.

Another embodiment of the disclosure provides an internal combustion engine including an engine block, a cylinder head, an exhaust manifold, integrated in the cylinder head and a cooling system according to any of the preceding embodiments.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
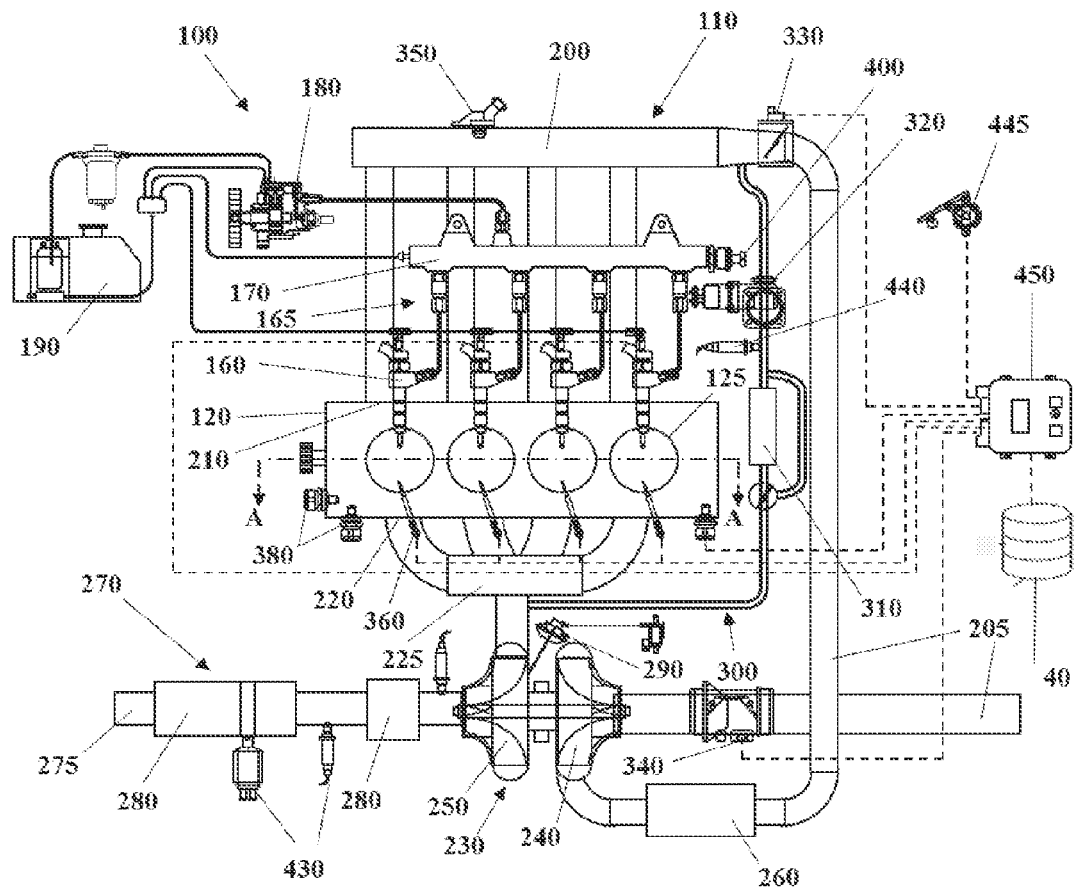
FIG. 1 shows an automotive system.
Figure 2:
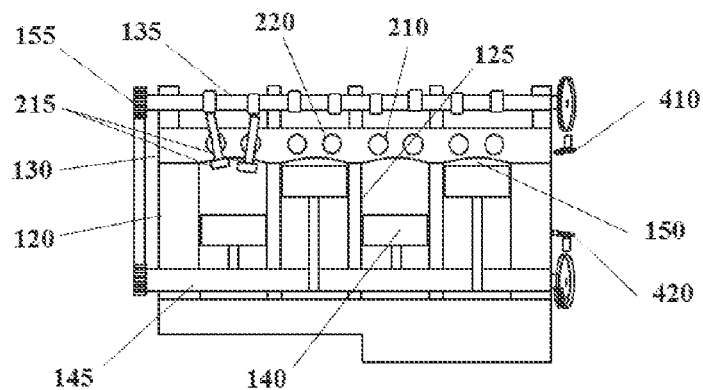
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145.

A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a fixed geometry turbine 250 including a waste gate 290. In other embodiments, the turbocharger 230 may be a variable geometry turbine (VGT) with a VGT actuator arranged to move the vanes to alter the flow of the exhaust gases through the turbine.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the waste gate actuator 290, and the cam phaser 155. Note, dashed lines are used to indicate communication between the ECU 450 and the various sensors and devices, but some are omitted for clarity.

Figure 3:
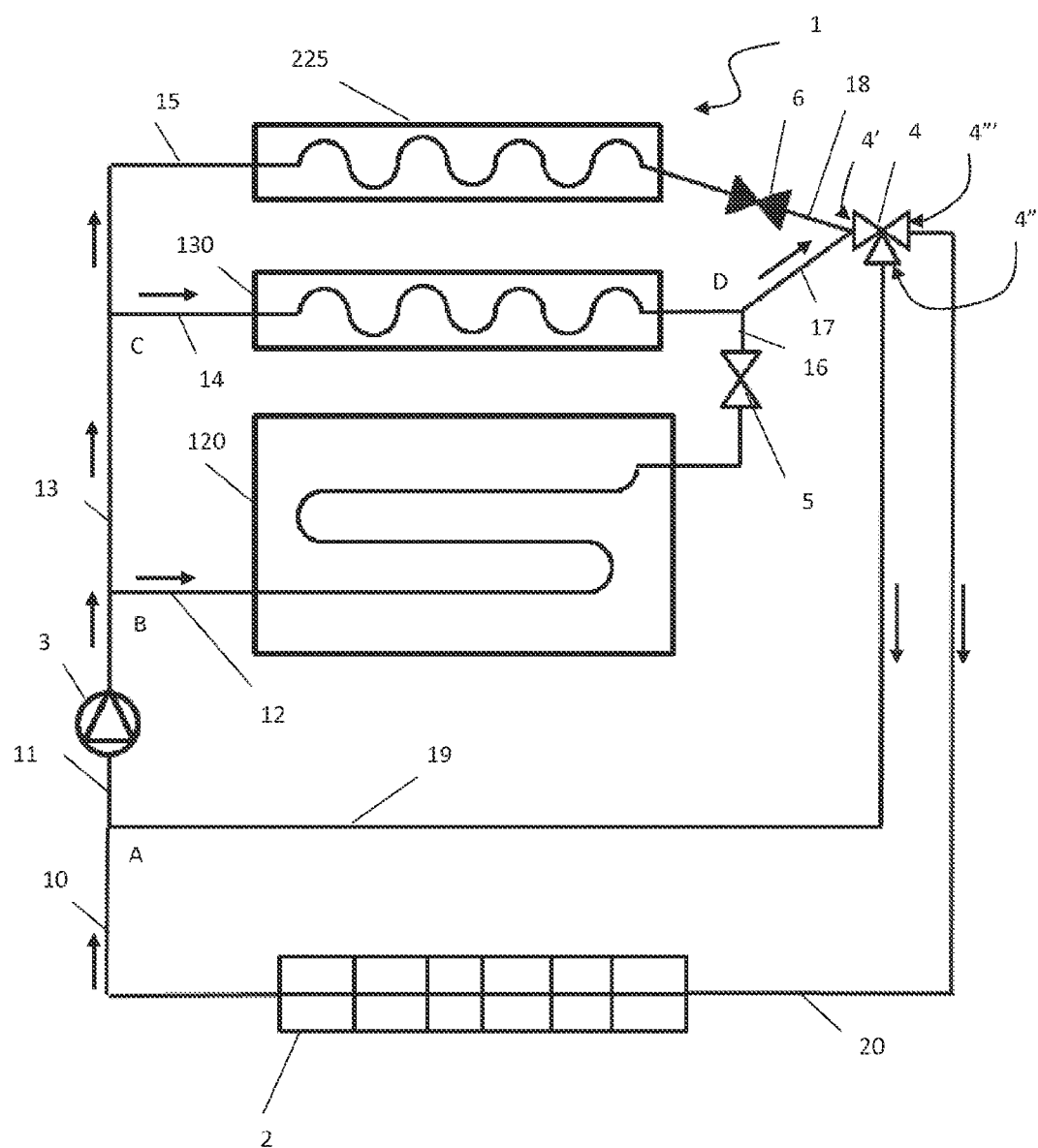
FIG. 3 is a schematic overview of a cooling system according to an embodiment of the present disclosure.

According to an embodiment of the present disclosure, the internal combustion engine has a design foreseeing an integrated exhaust manifold 225 in the cylinder head 130 and a split cooling system. FIG. 3 shows the cooling system 1, which includes a radiator 2 for exchanging heat between a liquid coolant and ambient air and a coolant pump 3, for circulating the liquid coolant. Preferably, the coolant pump can be a switchable water pump.

Moreover, the cooling system has several branches, fluid connecting the pump to the engine components, by splitting the coolant liquid among the several loops of the system. More in detail, a first set of fluid connection branches 12, 13, 14, 15 connects the coolant pump and the engine block 120, the cylinder head 130 and the exhaust manifold 225. Following FIG. 3 and starting from the coolant pump, a first part of the liquid coolant reaches the engine block 120 through the branches 13 and 12, a second part of the liquid coolant reaches the cylinder head 130 through the branches 13 and 14, and a third part of the liquid coolant reaches the exhaust manifold 225 through the branches 13 and 15.

A second set of fluid connection branches 16, 17, 18, 19, 20 connect the engine block, cylinder head and exhaust manifold with the radiator and/or the coolant pump. More in detail, and following FIG. 3, branch 16 collects coolant form the engine block, branch 17 from engine block and cylinder head, branch 18 from the exhaust manifold. Branches 19 and 11 recirculate the coolant to the coolant pump 2, while branch 20 recirculates the coolant to the radiator 3. Finally, branches 10 and 11 recirculate the coolant from the radiator to the coolant pump.

The cooling system is also provided with a first controlled valve 4 for intercepting the liquid coolant towards the radiator and recirculating the liquid coolant towards the coolant pump. As an example, this could be a 3-way valve, also called coolant control valve, whose inlet 4' is connected with branches 17, 18. Therefore, all coolant coming from the engine 110 (namely, engine block 120, cylinder head 130 and integrated exhaust manifold 225) reaches the inlet 4' of the first controlled valve 4. The valve 4 has two outlets 4" and 4'''. The outlet 4" is connected with the branch 19, while the outlet 4''' is connected with the branch 20. Therefore, by controlling this valve, the coolant can be addressed directly to pump, by passing the radiator, or to the radiator and then to the pump.

A second controlled valve 5 is located downstream the engine block and between branch 12 and branch 16. This valve 5 can intercept the coolant liquid coming from the cylinder block, thus avoiding the coolant circulation through the engine block. Finally, a third controlled valve 6 is located downstream the integrated exhaust manifold and between branch 15 and branch 18. This third controlled valve can intercept the coolant liquid coming from the integrated exhaust manifold. It has to be understood that the three valves can be realized as separate elements, as in the example of FIG. 3, or can be joined in a single component, provided that the different functions of the valves, as above described, can still be carried out.

Figure 4:
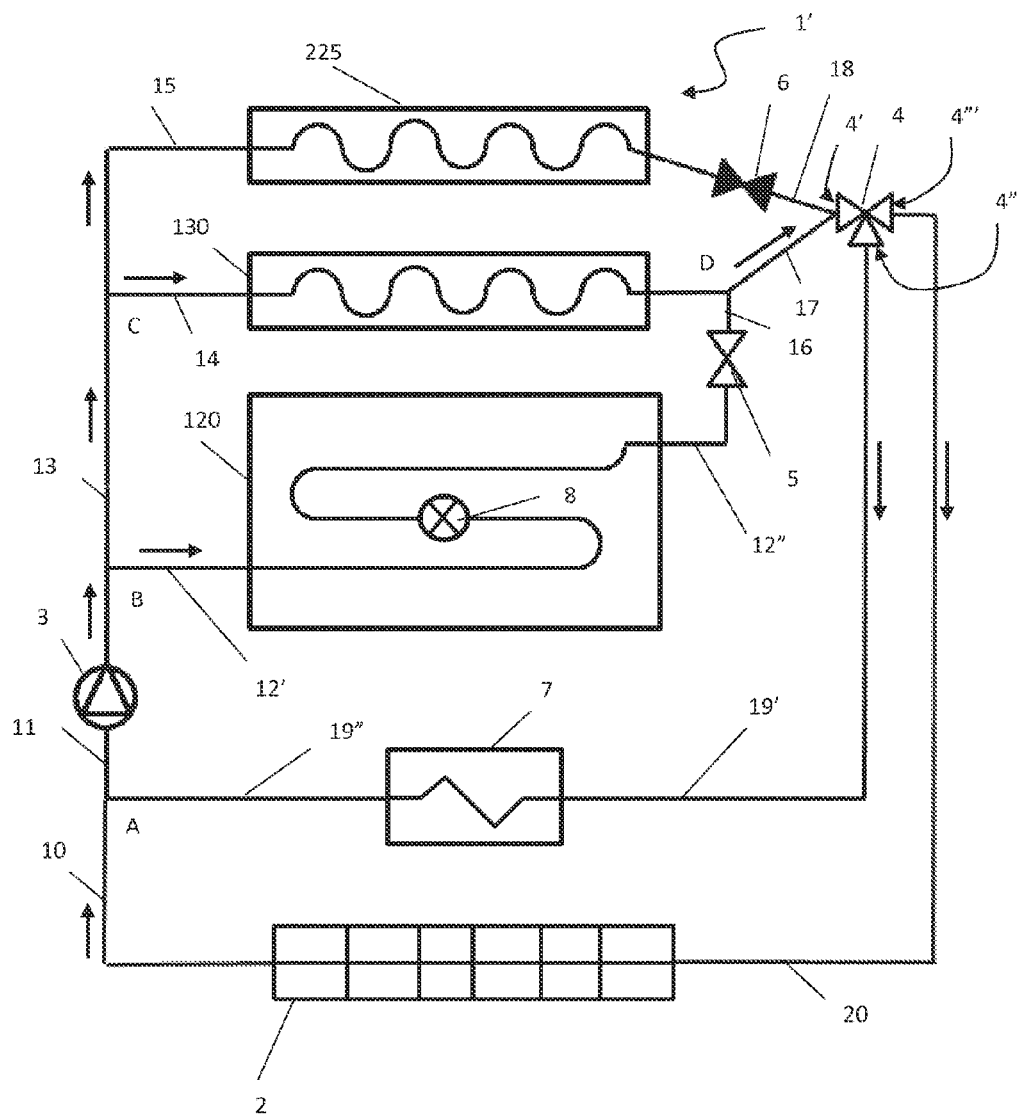
FIG. 4 is another schematic overview of a cooling system according to a different embodiment of the present disclosure.

According to a different embodiment the cooling system can also includes an oil heat exchanger and/or an electric heater. With reference to FIG. 4, the cooling system 1' includes an oil heat exchanger 7, which is located along the branch 19, i.e. between a first portion 19' and a second portion 19" of branch 19 (the radiator by-pass line). So the coolant will flow through the oil heat exchanger only during the engine warm up. The cooling system 1' also includes an electric heater 8 is located along the branch 12, in the engine block.

The cooling system, thanks to its split layout and the controlled valves can operate in different ways, during the engine warm up phase and after the warm up. Basically, at the very beginning of the engine warm up, if the coolant pump is a switchable coolant pump, the pump is switched off and no coolant circulation occurs. Then, in temporal sequence, the cooling system can be configured as follows.

As soon as the coolant pump 2 is switched on, the second 5 and the third 6 controlled valves will be closed and the first outlet 4" of the first controlled valve 4 will be open so that the coolant flows from the coolant pump to the cylinder head 130 (branches 13, 14) and back to the coolant pump (branch 19), by-passing the radiator 3. This is the first possible configuration during the engine warm up. Practically, only the cylinder head will be cooled (as explained, the head getting immediately very high temperature needs a faster cooling), while the engine block and the exhaust manifold will not be cooled. This allows the exhaust gas to immediately reach the light-off temperature.

The third controlled valve 6, which represents the core of the proposed cooling system, will remain closed until exhaust gases will reach a sufficient temperature threshold Tthr, corresponding about to the light-off temperature of the catalysts. For example, this threshold can be fixed at 200° C. After the exhaust gas temperature T reaches the temperature threshold Tthr, the valve 6 will be open. Therefore, this valve gives the opportunity to recover heat from the exhaust line also for that engines (like Diesels) very sensitive to the exhaust line warm-up time.

In fact, having the exhaust gases reached the light-off temperature (or more in general, the predetermined temperature threshold), the cooling system will be configured to keep the coolant pump 2 switched on, to close the second controlled valve 5 and to open the first outlet 4" of the first controlled valve 4 and the third controlled valve 6. The coolant will be split in two given amounts, a first given amount of the coolant flows from the coolant pump to the cylinder head 130 (branches 13 and 14), a second given amount of the coolant flows from the coolant pump 2 to the exhaust manifold 225 (branches 13 and 15), both first and second given amount of coolant flowing back to the coolant pump (branch 19), by-passing the radiator 3.

A third subsequent configuration of the cooling, as the engine warm up goes on, is the following: to open the first outlet 4" of the first controlled valve 4, the second controlled valve 5 and the third controlled valve 6. According to this configuration, the coolant will be split in three amounts, along three different paths: a first given amount of the coolant flows from the coolant pump to the cylinder head 130, a second given amount of the coolant flows from the coolant pump to the exhaust manifold 225, a third given amount of the coolant flows from the coolant pump to the engine block 120 (branches 13, 12), both first, second and third given amount of coolant flowing back to the coolant pump, by-passing the radiator 3, as in the previous configurations. This is the latest warm up phase: also the engine block needs to be cooled, while the coolant is not yet hot and does not need to be cooled by the radiator.

Finally, at the end of the warm up phase, all controlled valves 4, 5, and 6 will be open, but now will be open the second outlet 4''' of the first controlled valve 4. The coolant will flow as in the previous configuration through both cylinder head (and the integrated exhaust manifold) and the engine block, but the coolant will also flow through the radiator, no more by-passing it. The warm up phase is ended and also the coolant is hot enough and needs to be cooled.

Summarizing, the proposed cooling system will led to recover exhaust heat also for engines that are very sensitive to exhaust temperatures, by adding in its layout a controlled valve, by means of which the cooling of the exhaust manifold could occur or avoided according to the needs.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents

The invention claimed is:

1. A cooling system for an internal combustion engine having an engine block, a cylinder head and an exhaust manifold integrated in the cylinder head, the cooling system comprising:
 a radiator for exchanging heat between a coolant and ambient air;
 a coolant pump for circulating the coolant;
 a first set of fluid connection branches between the coolant pump and the engine block, the cylinder head and the exhaust manifold;
 a second set of fluid connection branches between the engine block, cylinder head and exhaust manifold and at least one of the radiator and the coolant pump;
 a first three-way controlled valve that selectively controls a flow of the coolant from the exhaust manifold, the cylinder head, and the engine block towards the radiator and the coolant pump;
 a second two-way controlled valve that selectively controls a flow of the coolant from the cylinder block to the first controlled valve; and
 a third two-way controlled valve that selectively controls a flow of the coolant from the integrated exhaust manifold to the first controlled valve; and
 a controller communicatively coupled to the first controlled valve, the second controlled valve, and the third controlled valve.

2. The cooling system according to claim 1, wherein said first three-way controlled valve further comprising an inlet for collecting coolant coming from the internal combustion engine, a first outlet in fluid connection with the coolant pump and a second outlet in a fluid connection with the radiator.

3. The cooling system according to claim 1, wherein said second controlled valve is located downstream the engine block and in a fluid connection with said first controlled valve.

4. The cooling system according to claim 1, wherein said third controlled valve is located downstream the exhaust manifold and in a fluid connection with said first controlled valve.

5. The cooling system according to claim 1, wherein the cooling system further comprises an oil heat exchanger.

6. The cooling system according to claim 1, wherein the cooling system further comprises an electric heater.

7. The cooling system according to claim 1, wherein the system is configured to switch on the coolant pump, to close the second and the third controlled valves, and to open the first outlet of the first controlled valve so that the coolant flows from the coolant pump to the cylinder head and back to the coolant pump, by-passing the radiator.

8. The cooling system according to claim 1, wherein the system being configured to keep the coolant pump switched on, to close the second controlled valve and to open the first outlet of the first controlled valve and the third controlled valve, so that a first given amount of the coolant flows from the coolant pump to the cylinder head, a second given amount of the coolant flows from the coolant pump to the exhaust manifold, both first and second given amounts of coolant flowing back to the coolant pump, by-passing the radiator.

9. The cooling system according to claim 1, wherein the system being configured to keep the coolant pump switched on, to open the first outlet of the first controlled valve, the second controlled valve and the third controller valve, so that a first given amount of the coolant flows from the coolant pump to the cylinder head, a second given amount of the coolant flows from the coolant pump to the exhaust manifold, a third given amount of the coolant flows from the coolant pump to the engine block, both first, second and third given amounts of coolant flowing back to the coolant pump, by-passing the radiator.

10. The cooling system according to claim 1, wherein the system being configured to keep the coolant pump switched on, to open the second outlet of the first controlled valve, the second controlled valve and the third controlled valve, so that a first given amount of the coolant flows from the coolant pump to the cylinder head, a second given amount of the coolant flows from the coolant pump to the exhaust manifold, a third given amount of the coolant flows from the coolant pump to the engine block, both first, second and third given amount of coolant flowing back to the radiator and then to the coolant pump.

11. The cooling system according to claim 1, wherein the system being configured to open the third controlled valve if an exhaust gas temperature is higher than an exhaust gas temperature threshold (Tthr).

12. The cooling system according to claim 11, wherein said exhaust gas temperature threshold (Tthr) is equal to 200° C.

13. An internal combustion engine comprising an engine block, a cylinder head, an exhaust manifold integrated in the cylinder head and a cooling system according to claim 1.

* * * * *